(12) United States Patent
Buettner et al.

(10) Patent No.: US 8,887,366 B2
(45) Date of Patent: Nov. 18, 2014

(54) PROCESSING WORKPIECES ON MACHINE TOOLS

(71) Applicant: TRUMPF Werkzeugmaschinen GmbH + Co. KG, Ditzingen (DE)

(72) Inventors: Stefan Buettner, Markgroeningen (DE); Wolfgang Laib, Besigheim (DE); Ignazio Spagnuolo, Hoefingen (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 17 days.

(21) Appl. No.: 13/778,632

(22) Filed: Feb. 27, 2013

(65) Prior Publication Data

US 2013/0199014 A1 Aug. 8, 2013

Related U.S. Application Data

(63) Continuation of application No. PCT/EP2011/064711, filed on Aug. 26, 2011.

(30) Foreign Application Priority Data

Aug. 31, 2010 (DE) .......... 10 2010 040 006

(51) Int. Cl.
*B23Q 17/00* (2006.01)
*G06F 19/00* (2011.01)
*G05B 19/18* (2006.01)
*B21D 28/26* (2006.01)
*B21D 43/28* (2006.01)
*G05B 19/416* (2006.01)

(52) U.S. Cl.
CPC ............ *G05B 19/182* (2013.01); *B21D 28/265* (2013.01); *B21D 43/282* (2013.01); *G05B 19/416* (2013.01)
USPC ...................... 29/407.08; 700/145

(58) Field of Classification Search
CPC .. B21D 28/365; B21D 43/282; G05B 19/182; G04B 19/416; B23Q 17/20
USPC .................... 29/407.08, 407.05, 407.01, 703; 700/145, 150, 46; 705/308
See application file for complete search history.

(56) References Cited

U.S. PATENT DOCUMENTS

| | | | |
|---|---|---|---|
| 7,483,837 B2 * | 1/2009 | Mallett et al. | 705/308 |
| 2009/0084236 A1 | 4/2009 | Wu et al. | |

FOREIGN PATENT DOCUMENTS

| | | |
|---|---|---|
| DE | 102005012742 A1 | 9/2006 |
| EP | 2184116 A1 | 5/2010 |
| EP | 2184118 A1 | 5/2010 |

OTHER PUBLICATIONS

International Search Report for corresponding PCT Application No. PCT/EP2011/064711, mailed Nov. 25, 2011, 4 pages.
Notification of Transmittal of the Translation of the International Preliminary Report on Patentability for corresponding PCT Application No. PCT/EP2011/064711, mailed Mar. 13, 2013, 6 pages.

* cited by examiner

*Primary Examiner* — John C Hong
(74) *Attorney, Agent, or Firm* — Fish & Richardson P.C.

(57) ABSTRACT

Methods and related computer program products for processing a workpiece on a machine tool, including changing at least one control parameter of the machine tool based on a quantity of waste and/or good components discharged from the machine tool during processing of the workpiece, the at least one control parameter causing a change of at least one waste and/or good component container of the machine tool, wherein the quantity of waste and/or good components generated as a function of time during processing of the workpiece is determined before processing of the workpiece begins, and is stored in a numerical control program of the machine tool.

11 Claims, 5 Drawing Sheets

PROCESSING WORKPIECES ON MACHINE TOOLS

CROSS REFERENCE TO RELATED APPLICATIONS

This application is a continuation of and claims priority under 35 U.S.C. §120 to PCT Application No. PCT/EP2011/064711 filed on Aug. 26, 2011, which claimed priority to German Application No. 10 2010 040 006.8 filed on Aug. 31, 2010. The contents of both of these priority applications are hereby incorporated by reference in their entirety.

TECHNICAL FIELD

This disclosure relates to processing workpieces on machine tools and related computer program products.

BACKGROUND

The software "CalcuMax," which is available from Megatech Software GmbH, can operate in parallel with conventional computer-aided design (CAD)/computer-aided manufacturing (CAM) programming systems to establish a production plan. Additionally, CalcuMax can fully and automatically calculate production costs for components that are produced using laser cutting, plasma cutting, flame cutting, or water jet cutting operations. CalcuMax includes a material management system in which waste and residual materials are also accounted for in the cost calculation. Operators of machine tools can inform CalcuMax of the material quantities used for the respective tasks so that for subsequent calculation of precise costs, additional material consumption (e.g., for running in the machines or post-production) is also taken into account.

However, employees in a machine hall and operators of the machine tools do not calculate waste and good component weights and volumes or resulting cost calculations. Therefore, an employee may have difficulty in estimating waste or good component quantities that will be generated during a particular period of time and, consequently, when containers will be completely filled with generated waste or good components. Accordingly, the employee may have difficulty in determining when the containers need to be changed (e.g., when maximum permissible weights for transport are reached) and the current weight of the workpiece being processed. Thus, the employee in the machine hall is unaware of the amount of waste that has been generated and that is sent to certain disposal companies. The employee may therefore rely on the disposal companies for the corresponding remuneration due if he has no other manner of determining the weight.

In the case of thick metal sheets, the dynamic capability of the machine tool processing operation may be reduced since the maximum permissible speed or maximum acceleration decreases as the weight of the workpiece increases.

SUMMARY

The present disclosure relates to optimizing handling of machine tools during processing of workpieces.

In one aspect of the invention, a method of processing a workpiece on a machine tool includes changing at least one control parameter of the machine tool based on a quantity of waste and/or good components discharged from the machine tool during processing of the workpiece, the at least one control parameter causing a change of at least one waste and/or good component container of the machine tool, wherein the quantity of waste and/or good components generated as a function of time during processing of the workpiece is determined before processing of the workpiece begins, and is stored in a numerical control (NC) program of the machine tool.

In another aspect of the invention, a computer program product, encoded on one or more computer storage media, includes instructions that when executed by one or more computers cause the one or more computers to perform operations including changing at least one control parameter of a machine tool based on a quantity of waste and/or good components discharged from the machine tool during processing of a workpiece, the at least one control parameter causing a change of at least one waste and/or good component container of the machine tool, wherein the quantity of waste and/or good components generated as a function of time during processing of the workpiece is determined before processing of the workpiece begins, and is stored an NC program of the machine tool.

In yet another aspect of the invention, a method of processing a workpiece on a machine tool includes determining a quantity of waste and/or good components generated as a function of time during processing of the workpiece, storing the quantity of waste and/or good components generated as a function of time in an NC program of the machine tool, using the machine tool to process the workpiece, wherein processing the workpiece includes discharging waste and/or good components, and changing at least one control parameter of the machine tool based on a quantity of waste and/or good components discharged from the machine tool.

In some embodiments, the quantity includes one or more of a number, a weight, a volume, and a surface area.

In certain embodiments, the workpiece is a sheet metal plate.

In some embodiments, a change of the at least one waste and/or good component container is a replacement of the at least one waste and/or good component container with another waste and/or good component container.

In certain embodiments, a change of the at least one waste and/or good component container is an emptying of the at least one waste and/or good component container.

In some embodiments, the method further includes adjusting a speed and/or an acceleration at which the workpiece is moved based on a weight of the workpiece, the weight of the workpiece decreasing during processing of the workpiece. Since, in the case of heavy workpieces to be moved, the maximum speed and/or maximum acceleration of the machine tool is reduced owing to the workpiece carrier load, particularly thick metal sheets have until now been processed during the entire processing operation at a reduced speed and/or acceleration. Depending on the quantity of waste and/or good components discharged during the processing operation, the maximum permissible speed and/or acceleration can be determined according to the decreasing workpiece weight, and the dynamics of the workpiece can be increased accordingly during the processing operation.

In certain embodiments, the method further includes adjusting a control parameter based on the quantity of waste and/or good components, the control parameter resulting in a change of at least one waste and/or good component container of the machine tool, the quantity of waste and/or good components increasing during processing of the workpiece.

Depending on the quantity of waste and/or good components discharged during the processing operation, the change of waste and/or good component containers can be carried out in an appropriate manner (e.g., either automatically or by indicating to the operator that the maximum permissible waste or good component quantity has been reached since the last container change). It is also possible, even before the change, to warn the operator in advance of when the next change will be necessary. For example, the time still remaining until the change of the waste container can be indicated to the operator.

In certain embodiments, the method further includes discharging the waste and/or good components produced during processing of the workpiece into different waste and/or good component containers, wherein the waste and/or good components are sorted into the different waste and/or good component containers based on types of the waste and/or good components. Accordingly, it is possible to estimate very precisely the quantities of waste generated, depending on the material and, accordingly, to calculate the associated remuneration. This enables the operator to identify errors in the waste remuneration promptly based on sorting the types of good components and to appropriately change the good component container. In contrast to the quantity of waste, in which generally only weight or volume is relevant, the quantity of good components to be picked may additionally and advantageously also account for the number of different good component types.

In certain embodiments, the method further includes indicating to an operator an impending change of a waste and/or good component container.

In some embodiments, the impending change is indicated to the operator by indicating a time remaining until a change of the waste and/or good component container.

In the NC program, the quantity (e.g., the weight, the surface area, the number, or the volume) of waste and/or good components is stored so that the machine tool can then calcuate from this the maximum permissible speeds and/or accelerations and the impending container changes. The NC program is consequently not bound to a specific machine tool with defined maximum speeds and/or accelerations or containers. Therefore, an NC program that has been written for one machine tool can also be used to carry out a process on another machine tool. Furthermore, adjusting an excessively high level of dynamics can be avoided, which could otherwise lead to the production of rejects. Additionally, container changes requested by the NC program (e.g., even though the containers requested are not at the other machine tool) can be avoided. Furthermore, the programmer on the CAD/CAM processor does not generally know the current filling state of the containers at the machine tool and therefore cannot determine when the container needs to be changed. In particular, there is an additional difficulty in that the NC program may only be produced hours after generation on the machine tool. The necessary calculations to determine the quantity of waste and/or good components generated as a function of time during processing of the workpiece are carried out on the NC unit of the machine tool (or on a control computer that may accordingly read information from the NC unit).

Other aspects, features, and advantages will be apparent from the description, the drawings, and the claims.

DETAILED DESCRIPTION

The control of machine tools is carried out using numerical controls, which may generally be divided into three types of control units. These control units include a Man Machine Communication (MMC) operating system, which includes a data input and a display unit, a Programmable Logic Controller (PCL) unit (e.g., a memory-programmable control), and an NC unit. Data and control commands are input via the MMC operating system, passed to the NC unit, and decoded in the NC unit. The data and control commands are further processed by the NC unit according to geometric and technological data and by the PCL unit according to switching commands. The NC and PCL units transmit the current machine status to the MMC operating system for display.

Figure 1:
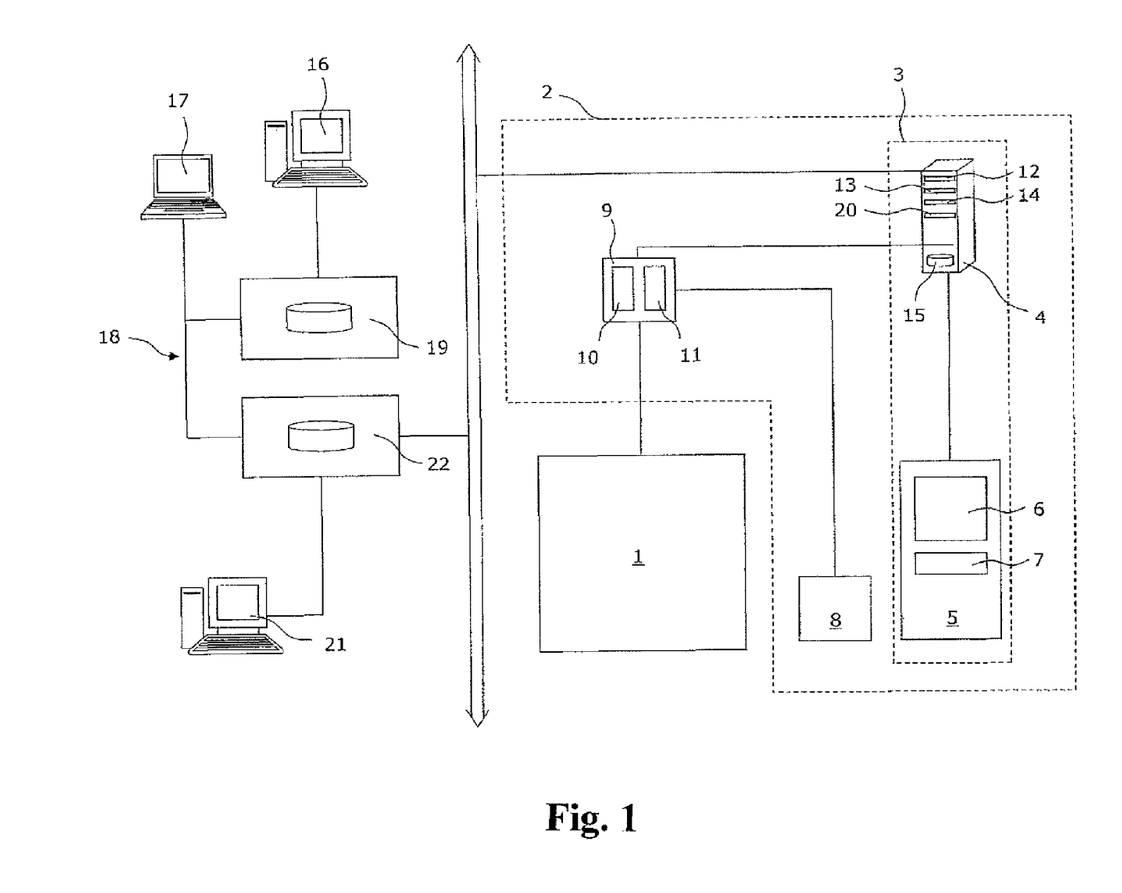
FIG. 1 shows a machine tool including a numerical control device.

FIG. 1 shows a machine tool 1 that is controlled by a numerical control device 2. The control device 2 includes an MMC operating system 3 that includes a control computer 4 (e.g., an industrial PC) and an operating device 5. The operating device 5 includes a screen 6 that provides a display unit and an input unit 7 (e.g., a keyboard, a mouse, or a touch panel). The control device 2 further includes a machine control panel 8 for manually operating the machine tool 1 (e.g., for performing safety-related operations) and an NC unit 9 that includes an integrated NC unit 10 and a PCL unit 11. The NC and PCL units 10, 11 can also be constructed as separate components.

The control device 2 further includes an operating software 12 for controlling the machine tool 1; software modules 13 for administering tasks, tools, and pallets; a program administration 14 for administering control programs; and a data store 15 for storing processing parameters (e.g., standard processing parameters) for the control programs. In some embodiments, the control programs include the NC program and the technological data that are exported from the NC program to external data stores. In some embodiments, other applications may be installed on the control computer 4, such as a design system, a programming system, or a combined design and programming system.

Producing a component using the machine tool 1 involves a designer, a programmer, and a machine operator performing various activities. Some such activities can be carried out by one person or by two persons together. The component is designed using a design system 16 (e.g., a CAD system) or a combined design and programming system 17 (e.g., a CAD/CAM system). Completed design drawings are stored on a common CAD data store 19 that is communicably coupled to a network 18, which is accessible to the programmers.

The machine tool 1 is controlled by control programs that are produced (e.g., automatically) by a programming system or that are produced manually on the operating device 5 of the MMC operating system 3. Programming systems can understand and execute basic and specific NC functions, determine which technological data are required, and determine which rules to apply to the processing. Consequently, the programming systems can automatically define the processing and generate a control program. In the embodiment illustrated in FIG. 1, in addition to the combined design and programming system 17, another programming system or combined design and programming system 20 is installed on the control computer 4, and a programming system 21 (e.g., a CAM system) is communicably coupled to the network 18. The programming systems 17, 20, 21 are connected to a CAM data store 22, which is accessible to the programmers and to the machine operators. A programmer stores the completed control programs in the CAM data store 22. The machine operator can access the CAM data store 22 and import the control programs from the CAM data store 22 into the program administration system 14 of the control computer 4.

During the programming operation, the programmer determines how a component will be processed. For example, the programmer determines which tools are used, in which sequence the processing operation is carried out, and the appropriate processing parameters to apply (e.g., the laser power and the advance speed). Programming systems assist the programmer in finding suitable processing parameters and processing strategies for a processing task. The information related to suitable processing parameters and processing strategies is included in so-called technology tables and control systems that are included in the data store 15. Depending on the material type, the material thickness, and the processing method, suitable processing parameters for the relevant variables that enable a process-reliable processing operation are stored in a technology table. In some embodiments, the technology tables are defined in accordance with other parameters. These parameters may include (e.g., in the case of laser cutting) the contour size, which is differentiated as small, medium, or large, and the type of machine on which the processing operation is carried out.

Figure 2:
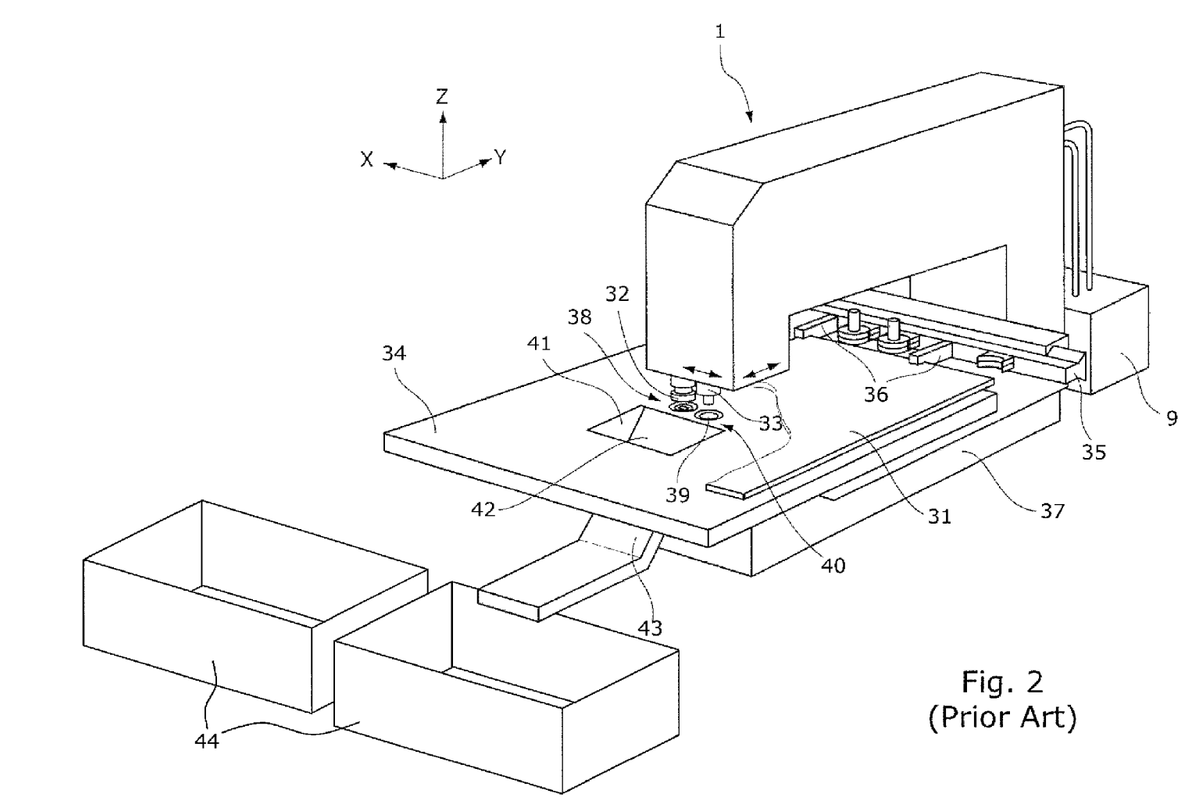
FIG. 2 shows a laser punching combination machine tool.

FIG. 2 shows a machine tool 1 that is constructed as a laser/punching combination machine. The machine tool 1 includes a punching shaping device 32 and a laser processing head 33 as processing tools for processing a workpiece 31 (e.g., a sheet metal plate). The workpiece 31 is supported on a workpiece table 34 during the workpiece processing operation. Using a conventional retention device 35 that has clamps 36 for retaining the workpiece 31, the workpiece 31 can be moved with respect to the fixed punching shaping device 32 and the laser processing head 33 along a first movement axis X of the metal sheet plane (i.e., an X-Y plane of an XYZ coordinate system). The workpiece 31 can be moved along a second movement axis Y of the metal sheet plane by a conventional coordinate guide (not illustrated) by the retention device 35 relative to a base 37 on which the workpiece table 34 is supported.

The workpiece 31 can consequently be moved along the first and second movement axes X, Y with respect to the punching shaping device 32 and the laser processing head 33 so that the region of the workpiece 31 to be processed can be moved into a processing region 38 of the punching shaping device 32 or a processing region 40 of the laser processing head 33, which is defined by a substantially circular opening 39 in the workpiece table 34. In contrast to the fixed punching shaping device 32, the laser processing head 33 can be moved by a movement unit (not illustrated) along the first and second movement axes X, Y within the processing region 40, as indicated by two double-headed arrows in FIG. 2. Furthermore, the laser processing head 33 can also be moved along a third movement axis Z in order to adjust a suitable focal point for the metal sheet processing operation.

In order to accommodate removal of workpiece cut-off pieces from the workpiece 31 after a final cutting-free operation, the workpiece table 34 includes a rectangular opening 41. The rectangular opening 41 can be opened and closed via a movable flap 42 (shown in the open state in FIG. 2). Prior to the final cutting-free operation, the workpiece 31 is positioned such that a workpiece cut-off piece (which has been partially cut free from the workpiece 31) rests over the opening 41, which has been closed with the flap 42. After the final cutting-free operation, the flap 42 is opened, and the workpiece cut-off piece (which has been completely cut free) falls under the action of gravitational force through the opening 42 and onto a slide 43. Once on the slide 43, the workpiece cut-off piece is discharged from the operating region of the machine tool 1 and sorted into various waste or good component containers 44.

Figure 3:
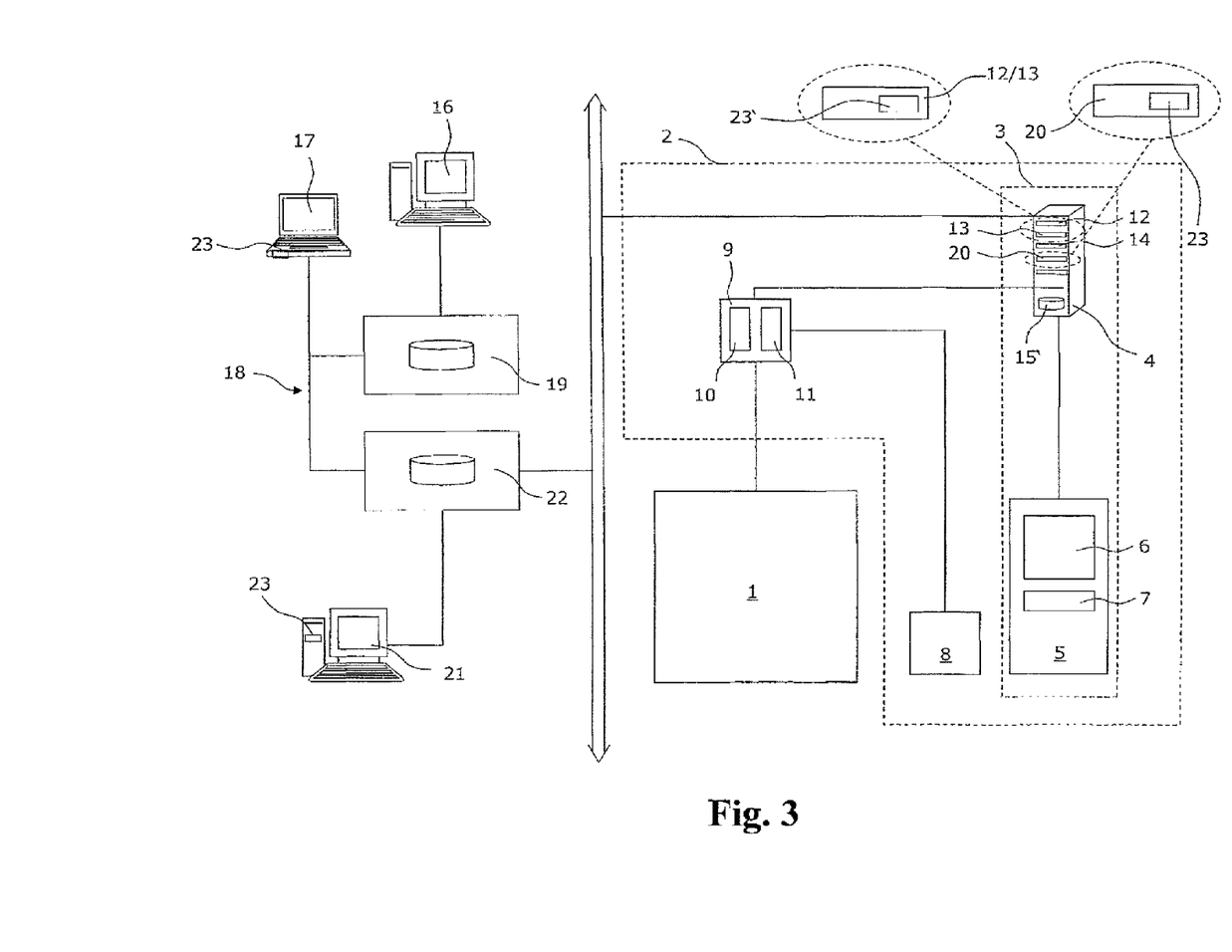
FIG. 3 shows a numerical control device of a machine tool including program modules.

FIG. 3 shows a machine tool 1 that is substantially similar to the machine tool 1 of FIG. 1, but includes program modules 23, 23'. The additional program module 23 may be provided with any of the programming systems 17, 20, 21 in order to process a workpiece. The program module 23 provides the NC programs with weight and/or volume information or surface area information relating to the processed sheet metal plates, good components or waste pieces, or remaining pieces.

If the NC program contains only surface area information, information such as material densities must additionally be provided on the control computer 4 of the machine tool 1 in order to precisely calculate the weights of the processed sheet metal plates, workpieces, etc. This material data can be stored, for example, in an expanded data store 15'. Storing the material data on the control computer 4 advantageously allows the operator to use sheet metal plates from materials other than those originally selected, while still allowing correctly calculated weights to be provided to the NC unit 9 in accordance with the methods of FIGS. 4 and 5. The program module 23' in the operating software 12 and/or the task administration software 13 may be used to calculate the correct weights and/or volumes.

Figure 4:
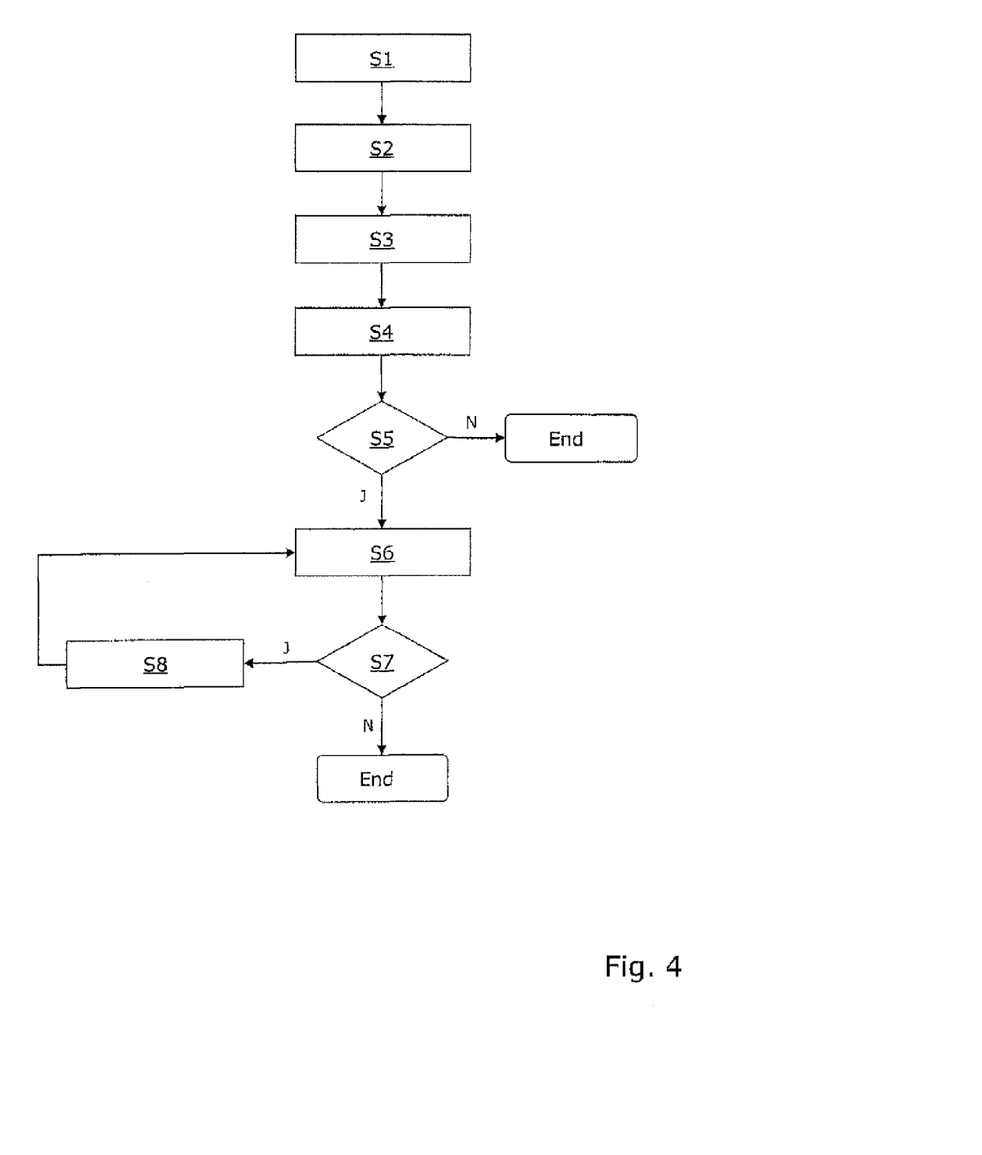
FIG. 4 shows a method of processing a workpiece based on a weight of the workpiece.

FIG. 4 shows a method of processing a workpiece based on a weight of the workpiece. In step S1, an NC program for producing one or more good components from a sheet metal plate is set up by the CAM system 21. This NC program includes information related to the size of the good components, waste pieces, and/or remaining pieces. In step S2, the operating software 12 of the control computer 4 calculates or provides (e.g., from the NC program) other sheet metal plate parameters transmitted to or stored on the machine tool (e.g., the total weight and the weight per unit surface area of the sheet metal plate and the sheet metal components to be unloaded). In step S3, the NC program is then deconstructed by the operating software 12 (e.g., translated into a form that is readable by the NC unit 10). In step S4, the machine operator initiates the processing of the NC program in the operating software 12, whereby the NC program and size and weight per unit surface area of the sheet metal plate are transmitted to the NC unit 9.

In step S5, the NC unit 9 determines whether or not the weight of the sheet metal plate exceeds a threshold value, from which the machine tool 1 can no longer be operated safely at maximum processing speed or acceleration. If this threshold value is not exceeded (N in S5), the processing of the NC program is carried out as normal with a maximum dynamic level of the machine tool 1, and the method ends. If the weight of the sheet metal plate exceeds the threshold value (J in S5), the method continues on to step S6. In step S6, the maximum permissible processing speed and acceleration of the machine tool 1 at this time (e.g., a control parameter) are determined based on the weight of the sheet metal plate, and the processing of the NC program is consequently started. In step S7, the NC program is processed until the next sheet metal component (e.g., good components, waste components, punched-out components, etc.) is discharged (J in S7) or until the NC program ends (N in S7), whereby the method also ends. When the sheet metal component has been unloaded in step S7 (J in S7), the method continues on to step S8. In step S8, the weight of the remaining plate is read or calculated by the NC unit 9 from the plate information determined in step S1 or S2. Using the established weight of the remaining plate, the method continues by returning to step S6.

Figure 5:
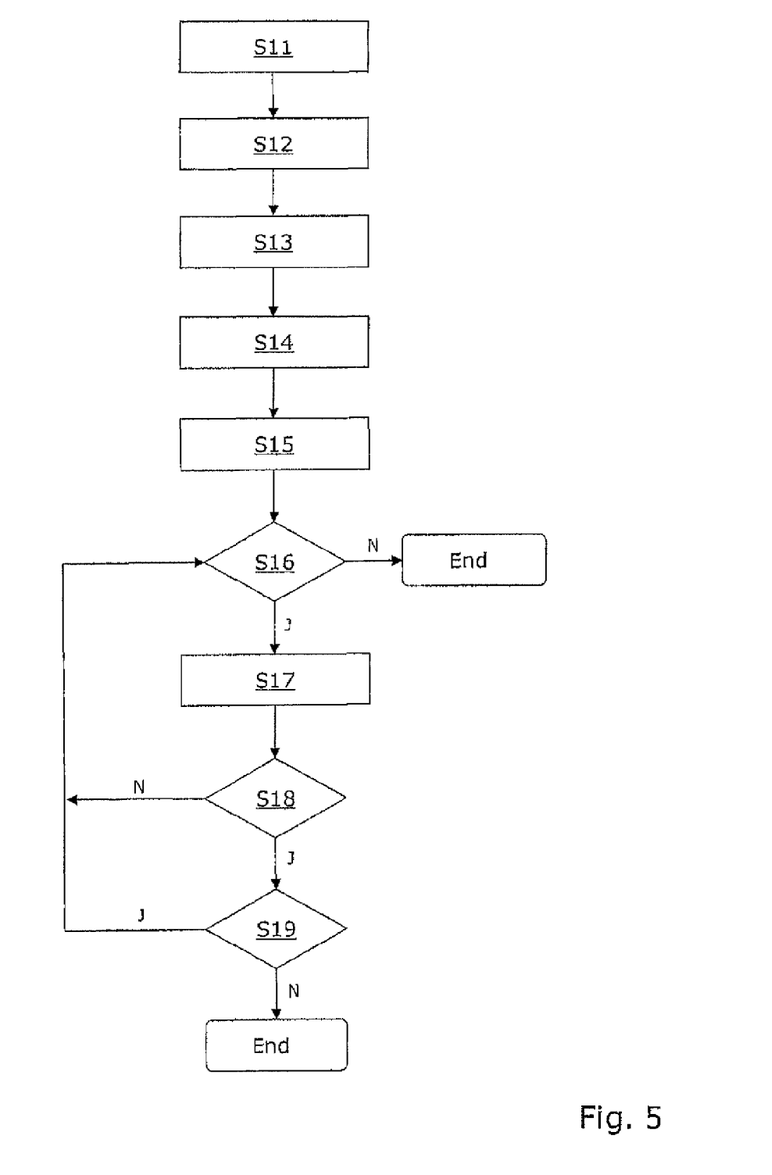
FIG. 5 shows a method of processing a workpiece based on a weight of a container.

FIG. 5 shows a method of processing a workpiece based on a weight of a container. In step S11, at least one NC program for producing one or more workpieces from a sheet metal plate is set up by the CAM system 21. This NC program may contain information relating to the size and/or weight of the workpieces, waste, or remaining portions. In step S12, the operating software 12 of the control computer 4 calculates or provides (e.g., from the NC program) other workpiece parameters that are transmitted to or stored on the machine (e.g., the total weight and the weight per unit surface area of the sheet metal plate and the sheet metal components to be discharged, and/or the volume thereof). In step S13, the NC program is then deconstructed by the operating software 12 (e.g., translated into a form that is readable by the NC unit 10). In step S14, the machine operator initiates the processing of the NC program in the operating software 12, whereby the NC program and the size and the weight per unit surface area of the sheet metal plate and/or the volume are transmitted to the NC unit 9.

In step S15, the NC program is carried out by the NC unit 9 until the next unloading operation of a sheet metal component (e.g., a good component, a waste component, a punched-out component, etc.) (J in S16). If there is no other unloading operation provided in the NC program, processing of the sheet metal component is completed (N in S16), and the method ends. If there are one or more additional unloading operations provided in the NC program (J in S16), then the method continues on to step S17. In step S17, the corresponding sheet metal portion is unloaded, and the weight and/or volume of the unloaded sheet metal portion in the NC unit 9 is read or calculated from the plate information determined in step S11 or S12 and stored in the appropriate waste container 44. In step S18, the weight of all of the sheet metal components in the waste container 44 last used is calculated and compared with a defined maximum weight and/or volume of a particular container. Should the maximum weight and/or volume not be exceeded (N in S18), the method continues and returns to step S16. If the maximum weight and/or volume is reached (J in S18), the method continues to step S19. In step S19, a container change (e.g., replacing the container with another container or partially or fully emptying the container) is initiated by a control parameter, which causes the waste container 44 to be changed. Should the processing of the NC program stop as a result of the excessively high weight or volume in the waste container 44 (N in S19), then the method ends. If, in step S19, the waste container 44 is emptied or replaced by an operator or an automation device, and this has been transmitted to the NC unit 9, the value of the weight and/or volume for the corresponding container stored in the NC unit 9 is set to zero (J in S19), and the method continues and returns to step S16. In some embodiments, if the introduced container has not been completely emptied, the value of the weight and/or volume of the introduced container 44 can be set to a non-zero value (e.g., by an operator, an automation device, etc.).

In some embodiments, a reserve capacity of the waste container 44 can be verified in step S19. If there is still a sufficient reserve in the waste container 44, then a container change can be delayed. In this instance, an instruction is stored in the NC unit 9 and provides that a container change is to be initiated when the processing of the NC program ends, (N in S16). This can be carried out by providing an indication to the operator or to the automation unit of the machine tool 1.

In certain embodiments, the weight of the metal sheet portion stored in the NC unit 9 is compared to a fixed maximum weight and/or maximum volume of the waste container 44 at the end of the completed NC program, and, if necessary, a container change is initiated.

In some embodiments, the size (e.g., surface area and/or volume) of the sheet metal components can be provided to the NC unit 9 instead of or in addition to the weight. This can also be carried out according to the bulkiness of the sheet metal portions. In this manner, changing the waste container 44 is also advantageously initiated when, in the case of light or bulky metal sheets/metal sheet portions (e.g., which may be particularly large or oddly shaped), the maximum weight has not yet been reached but the waste container 44 is full owing to the large volume of sheet metal.

In certain embodiments, the calculation of step S12 can also be carried out by the task administration software module 13 alone or by the task administration software module 13 together with the operating software 12. The advantage of including the software module 13 for the task administration in the calculation is that NC programs and the processing times thereof for the next pending tasks are already stored or can be calculated therein. Consequently, together with the values of the weights and/or volumes of the sheet metal components in the waste or good component containers 44 stored in the NC unit 9, the time required before a container needs to be changed can be calculated and displayed on the display unit 6. This is particularly advantageous when the operator has to carry out the container change manually and can consequently plan how much time he has left for other activities. The time displayed on the display unit 6 can be updated during the following steps S13 to S19.

In some embodiments, the NC program set up in step S11 includes information related to the types of good components to be produced therewith. In step S11 or S12, additionally or alternatively, a picking operation of the various types of good components can be input (e.g., by programmers, machine operators, or a task administration program) so that the NC unit 9 is informed in step S14 of the maximum number of types of good components that may be unloaded per good component container 44. In contrast to the above method, in step S17, the number of unloaded good components can additionally or alternatively be stored in the appropriate good component container 44. In step S18, it can accordingly be verified whether or not the maximum permissible number of good components has been reached and whether or not a good component container 44 needs to be changed.

A number of embodiments have been described. Nevertheless, it will be understood that various modifications may be made without departing from the spirit and scope of the disclosure. For example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method of processing a workpiece on a machine tool, comprising changing at least one control parameter of the machine tool based on a quantity of waste and/or good components discharged from the machine tool during processing of the workpiece, the at least one control parameter causing a change of at least one waste and/or good component container of the machine tool, wherein the quantity of waste and/or good components generated as a function of time during processing of the workpiece is determined before processing of the workpiece begins, and is stored in a numerical control program of the machine tool.

2. The method according to claim 1, wherein the quantity comprises one or more of a number, a weight, a volume, and a surface area.

3. The method according to claim 1, wherein the workpiece comprises a sheet metal plate.

4. The method according to claim 1, wherein a change of the at least one waste and/or good component container comprises a replacement of the at least one waste and/or good component container with another waste and/or good component container.

5. The method according to claim 1, wherein a change of the at least one waste and/or good component container comprises an emptying of the at least one waste and/or good component container.

6. The method according to claim 1, further comprising adjusting a speed and/or an acceleration at which the workpiece is moved based on a weight of the workpiece, the weight of the workpiece decreasing during processing of the workpiece.

7. The method according to claim 1, further comprising discharging the waste and/or good components produced during processing of the workpiece into different waste and/or good component containers, wherein the waste and/or good components are sorted into the different waste and/or good component containers based on types of the waste and/or good components.

8. The method according to claim 1, further comprising indicating to an operator an impending change of a waste and/or good component container.

9. The method according to claim 8, wherein the impending change is indicated to the operator by indicating a time remaining until a change of the waste and/or good component container.

10. A computer program product, tangibly embodied on one or more non-transitory computer storage media, comprising instructions that when executed by one or more computers cause the one or more computers to perform operations comprising changing at least one control parameter of a machine tool based on a quantity of waste and/or good components discharged from the machine tool during processing of a workpiece, the at least one control parameter causing a change of at least one waste and/or good component container of the machine tool, wherein the quantity of waste and/or good components generated as a function of time during processing of the workpiece is determined before processing of the workpiece begins, and is stored in a numerical control program of the machine tool.

11. A method of processing a workpiece on a machine tool, comprising:
- determining a quantity of waste and/or good components generated as a function of time during processing of the workpiece;
- storing the quantity of waste and/or good components generated as a function of time in a numerical control program of the machine tool;
- using the machine tool to process the workpiece, wherein processing the workpiece comprises discharging waste and/or good components; and
- changing at least one control parameter of the machine tool based on a quantity of waste and/or good components discharged from the machine tool.

* * * * *